(12) United States Patent
Kobayashi

(10) Patent No.: US 11,233,753 B2
(45) Date of Patent: Jan. 25, 2022

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventor: Kento Kobayashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/022,121

(22) Filed: Sep. 16, 2020

(65) Prior Publication Data

US 2021/0250310 A1 Aug. 12, 2021

(30) Foreign Application Priority Data

Feb. 6, 2020 (JP) .............................. JP2020-018722

(51) Int. Cl.
*H04L 12/58* (2006.01)
(52) U.S. Cl.
CPC .................................. *H04L 51/02* (2013.01)
(58) Field of Classification Search
CPC ... H04L 51/02; H04L 65/1069; H04L 51/066; H04L 51/32; H04L 51/18; H04L 51/046; G06N 20/00
See application file for complete search history.

(56) References Cited

U.S. PATENT DOCUMENTS

| | | | | |
|---|---|---|---|---|
| 9,729,475 | B1* | 8/2017 | Youst | H04M 1/72436 |
| 2012/0096097 | A1* | 4/2012 | Morinaga | G06Q 10/107 |
| | | | | 709/206 |
| 2017/0293681 | A1 | 10/2017 | Blandin et al. | |
| 2018/0159805 | A1* | 6/2018 | Jones | G06F 40/274 |
| 2018/0302350 | A1* | 10/2018 | Luo | G06F 3/0237 |
| 2020/0120049 | A1* | 4/2020 | Galloway | H04M 1/72577 |
| 2020/0403956 | A1* | 12/2020 | Adamski | H04L 51/10 |

FOREIGN PATENT DOCUMENTS

| | | |
|---|---|---|
| JP | 2013-020485 | 1/2013 |
| JP | 2019-091178 | 6/2019 |
| JP | 2019518292 | 6/2019 |

* cited by examiner

*Primary Examiner* — Soe Hlaing
(74) *Attorney, Agent, or Firm* — JCIPRNET

(57) ABSTRACT

An information processing apparatus includes memory and a processor. When first and second users have a conversation by transmitting and receiving conversation information to and from each other, and the first user chooses to use an automatic reply function for conversation information that is transmitted from the second user after the first user has received conversation information from the second user at least once or more, the processor is configured to automatically reply to conversation information that is transmitted to the first user from the second user after the first user has made the choice.

7 Claims, 15 Drawing Sheets

FIG. 4

| RECEIVED MESSAGE | AUTOMATIC REPLY MESSAGE |
|---|---|
| WHAT IS YOUR FAVORITE OOO? | I DON'T REALLY HAVE A FAVORITE OOO. |
| IS THERE ANY PLACE YOU WANT TO GO? | I HAVE NO PARTICULAR PLACE I WANT TO GO RIGHT NOW. |
| DO YOU KNOW OO? | I'M SORRY, I DON'T KNOW. |
| CAN I HAVE YOUR CONTACT DETAILS? | I'M TRYING TO REPLACE MY CELL PHONE, SO PLEASE WAIT UNTIL I GET A NEW ONE. |
| DO YOU HAVE ANY HOBBIES? | I DON'T HAVE ANY HOBBIES. |
| I'D LIKE TO MEET YOU IN PERSON. | I'VE BEEN BUSY WITH WORK, SO I'LL CONTACT YOU ONCE THINGS SETTLE DOWN. |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-018722 filed Feb. 6, 2020.

BACKGROUND

(i) Technical Field

The present disclosure relates to an information processing apparatus and a non-transitory computer readable medium.

(ii) Related Art

Japanese Unexamined Patent Application Publication No. 2013-020485 discloses a matching system that enables a user to register their personal information as searchable information along with their identification information, the personal information including random attribute information that is desired by the user to match other user's random attribute information when the users at least guess each other so as to be matched each other. In addition, the matching system allows a user to register their information and a target user's information in a pair as a predetermined message and limits the number of times the registered information is available within a predetermined period of time or the number of target users to which the registered information is transmittable within a predetermined period of time.

Japanese Unexamined Patent Application Publication No. 2019-091178 discloses a matching support apparatus that causes written information related to a first host user to be displayed as introduction information on a terminal apparatus of a second guest user. When the second guest user sends a request for transmission of message information to a first guest user, and an acceptance response is sent by the first guest user, the matching support apparatus associates the first guest user and the second guest user with each other as matched users.

Japanese Unexamined Patent Application Publication (Translation of PCT Application) No. 2019-518292 discloses a technology for generating a sequence model by performing machine learning of natural language on a plurality of conversation samples formed of interactions between users and robots so as to achieve conversation between a user and a robot on the basis of the generated sequence model.

SUMMARY

Aspects of non-limiting embodiments of the present disclosure relate to providing an information processing apparatus and a non-transitory computer readable medium capable of reducing the time and effort that is expended by a user, who transmits and receives conversation information with another user, in continuing conversation with the other user even when the user no longer desires to continue the conversation.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including memory and a processor. When first and second users have a conversation by transmitting and receiving conversation information to and from each other, and the first user chooses to use an automatic reply function for conversation information that is transmitted from the second user after the first user has received conversation information from the second user at least once or more, the processor is configured to automatically reply to conversation information that is transmitted to the first user from the second user after the first user has made the choice.

BRIEF DESCRIPTION OF THE DRAWINGS

An exemplary embodiment of the present disclosure will be described in detail based on the following figures, wherein:

FIG. 4 is a diagram illustrating an example of an auto-reply conversation table that is stored in an auto-reply-conversation-table storage unit illustrated in FIG. 3;

DETAILED DESCRIPTION

An exemplary embodiment of the present disclosure will be described in detail below with reference to the drawings.

Figure 1:
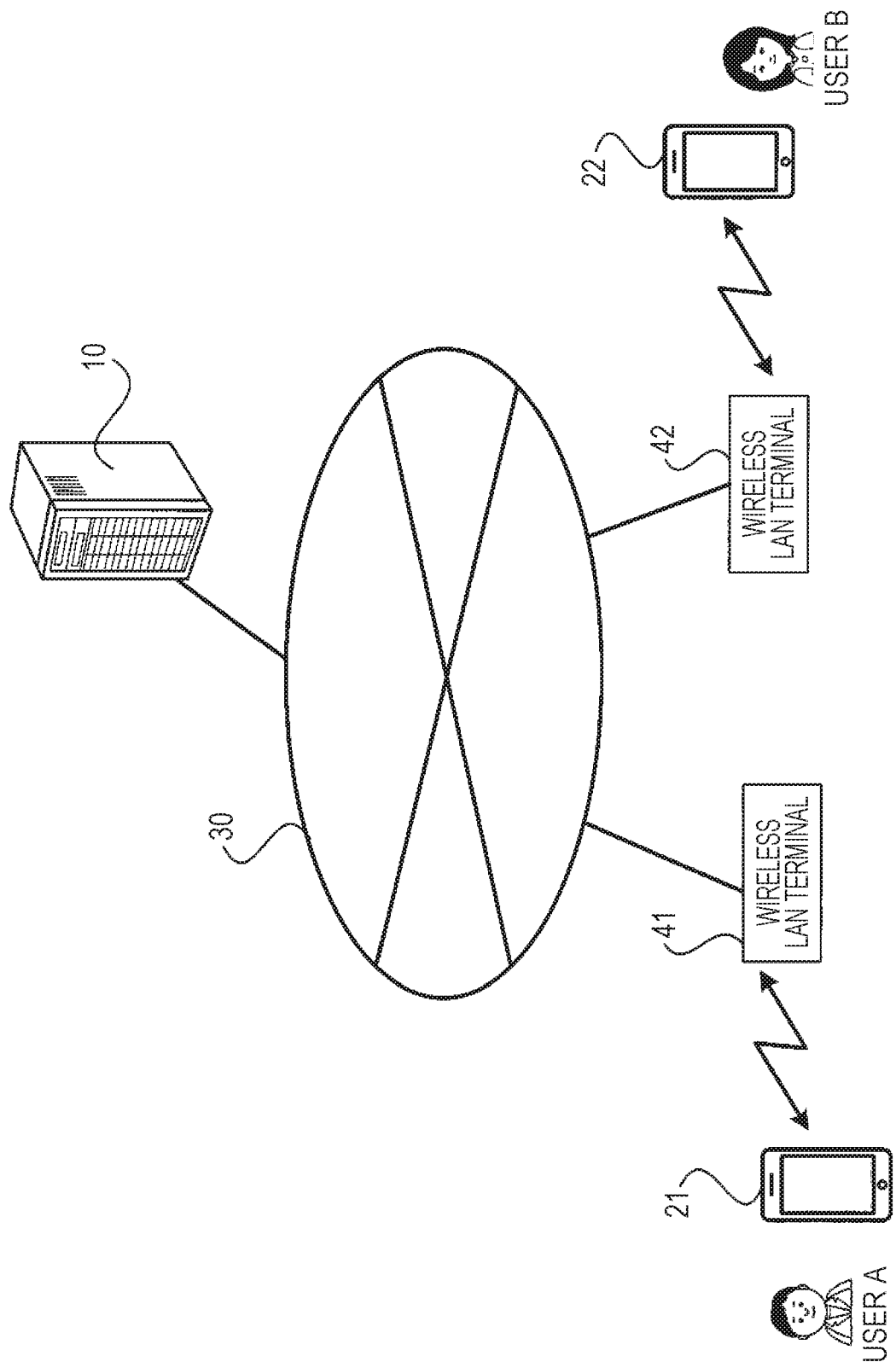
FIG. 1 is a diagram illustrating a system configuration of a matching system according to the exemplary embodiment of the present disclosure.

FIG. 1 is a diagram illustrating a system configuration of a matching system according to the exemplary embodiment of the present disclosure.

The matching system of the exemplary embodiment of the present disclosure has a configuration in which a matching-service providing server 10 is connected to terminal apparatuses 21 and 22 via the Internet 30 as illustrated in FIG. 1. Note that, in the present exemplary embodiment, only two terminal apparatuses, which are the terminal apparatus 21 that is operated by a user A and the terminal apparatus 22 that is operated by a user B, are illustrated in FIG. 1 in order to make the following description simple. In practice, however, a large number of terminal apparatuses are connected to the matching-service providing server 10 via the Internet 30.

Here, the terminal apparatuses 21 and 22 are mobile terminals such as smartphones and are connected to the Internet 30 via wireless LAN terminals 41 and 42, respectively.

The matching-service providing server 10 is an information processing apparatus that provides, to a plurality of users who have been registered in advance, a matching service for, for example, finding a person of the opposite sex who may become a dating partner or a marriage partner. Such a matching service is provided with the aim of enabling each user to find a person of the opposite sex who has the same hobby as the user or who meets a criterion set by the user by browsing profiles of a large number of people of the opposite sex who are registered in the service.

In recent years, matching services for, for example, finding a dating partner or a marriage partner have been widely used. In such matching services, a user sends a message transmission request to another user he/she is interested in, and once the other user has accepted the message transmission request, the two users are brought into a matched state and become capable of transmitting and receiving conversation information to and from each other.

Accordingly, the two users in the matched state start a chat, which is an interaction that is performed by transmitting and receiving conversation information to and from each other, before actually seeing each other.

Here, before the two users are brought into the matched state, the user is allowed to obtain only profile information, which has been registered by the other user, as the information related to the other user, and thus, the other user's personality or character is unknown to the user. Consequently, there is a possibility that the user will no longer desire to continue to chat with the other user, who is in the matched state with the user, in the middle of the chat.

In such a case, a blocking function enables the user to hide from the other person on the matching service. However, since this function hides the presence of the user, there is a possibility that the other user will notice that he/she has been blocked by the user, and the other user may sometimes feel unpleasant or become enraged.

Also if the user ignores the chat without using the blocking function and does not reply to the other user, the other user may sometimes feel unpleasant.

Thus, even when the user does not desire to continue the chat with the other user, in order to amicably end the conversation, the user needs to keep the conversation as superficial as possible while continuing the conversation, and this requires the user to expend unnecessary effort.

Accordingly, in the matching service provided by the matching-service providing server 10 of the present exemplary embodiment, when one of two users who transmit and receive conversation information to and from each other no longer desires to continue the conversation with the other user, processing which will be described later is performed, so that the time and effort that is expended by the user in continuing the conversation with the other user may be reduced. In other words, according to the matching-service providing server 10 of the present exemplary embodiment, in a case such as described above, the time and effort expended by a user in ending conversation with another user without making the other user feel unpleasant may be reduced.

Figure 2:
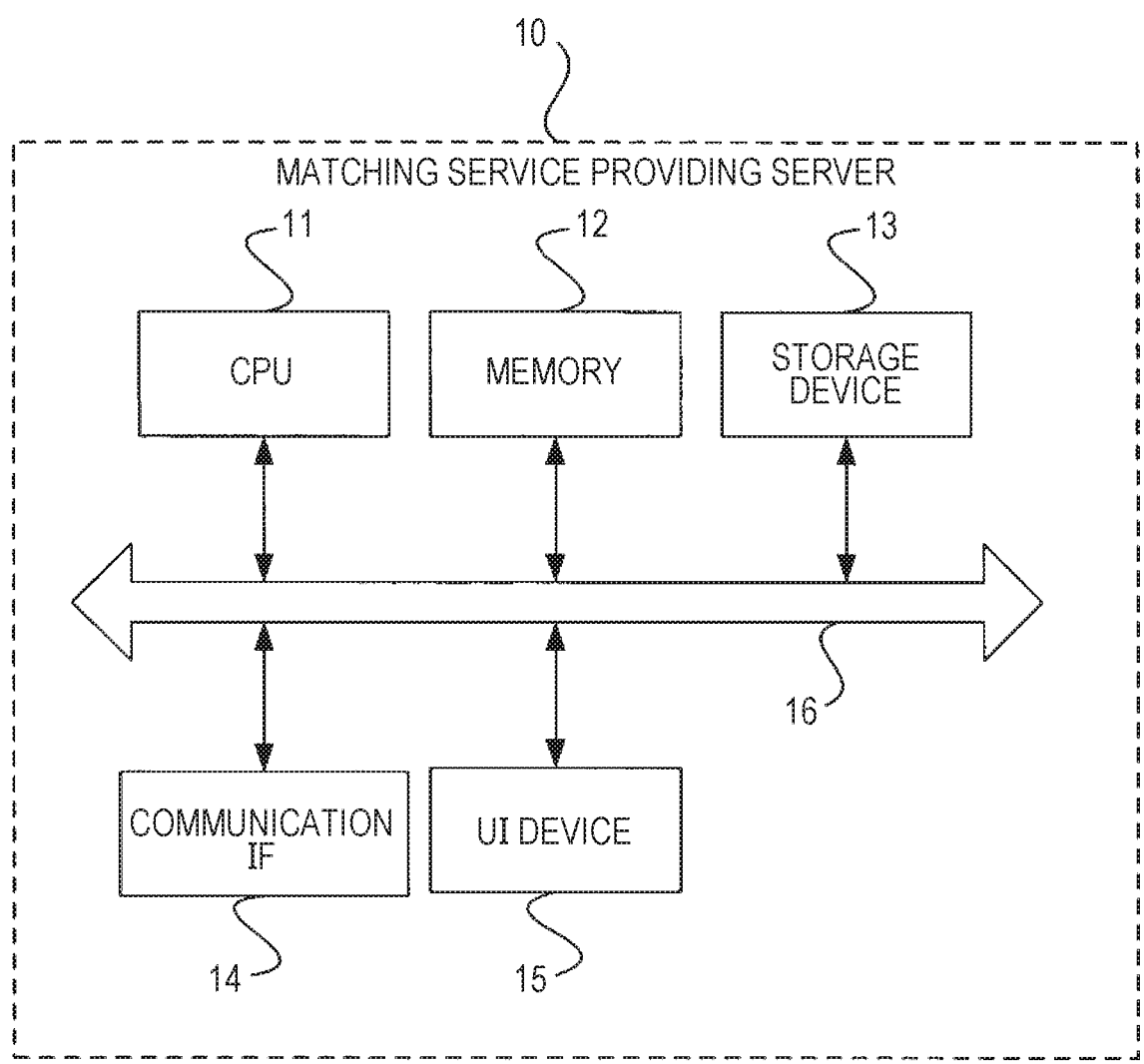
FIG. 2 is a block diagram illustrating a hardware configuration of a matching-service providing server according to the exemplary embodiment of the present disclosure.

Next, FIG. 2 illustrates the hardware configuration of the matching-service providing server 10 in the matching system of the present exemplary embodiment.

As illustrated in FIG. 2, the matching-service providing server 10 includes a CPU 11, memory 12, a storage device 13 such as a hard disk drive, a communication interface (IF) 14 that performs transmission and reception of data with, for example, an external device via the Internet 30, and a user interface (UI) device 15 that includes a touch panel or a liquid crystal display and a keyboard. These components are connected to one another via a control bus 16.

The CPU 11 is a processor that controls the operation of the matching-service providing server 10 by performing predetermined processing on the basis of a control program stored in the memory 12 or the storage device 13. Note that, in the description of the present exemplary embodiment, although the CPU 11 is configured to read and run a control program stored in the memory 12 or the storage device 13, the program may be provided to the CPU 11 by being stored in a storage medium such as a compact disc read-only memory (CD-ROM).

Figure 3:
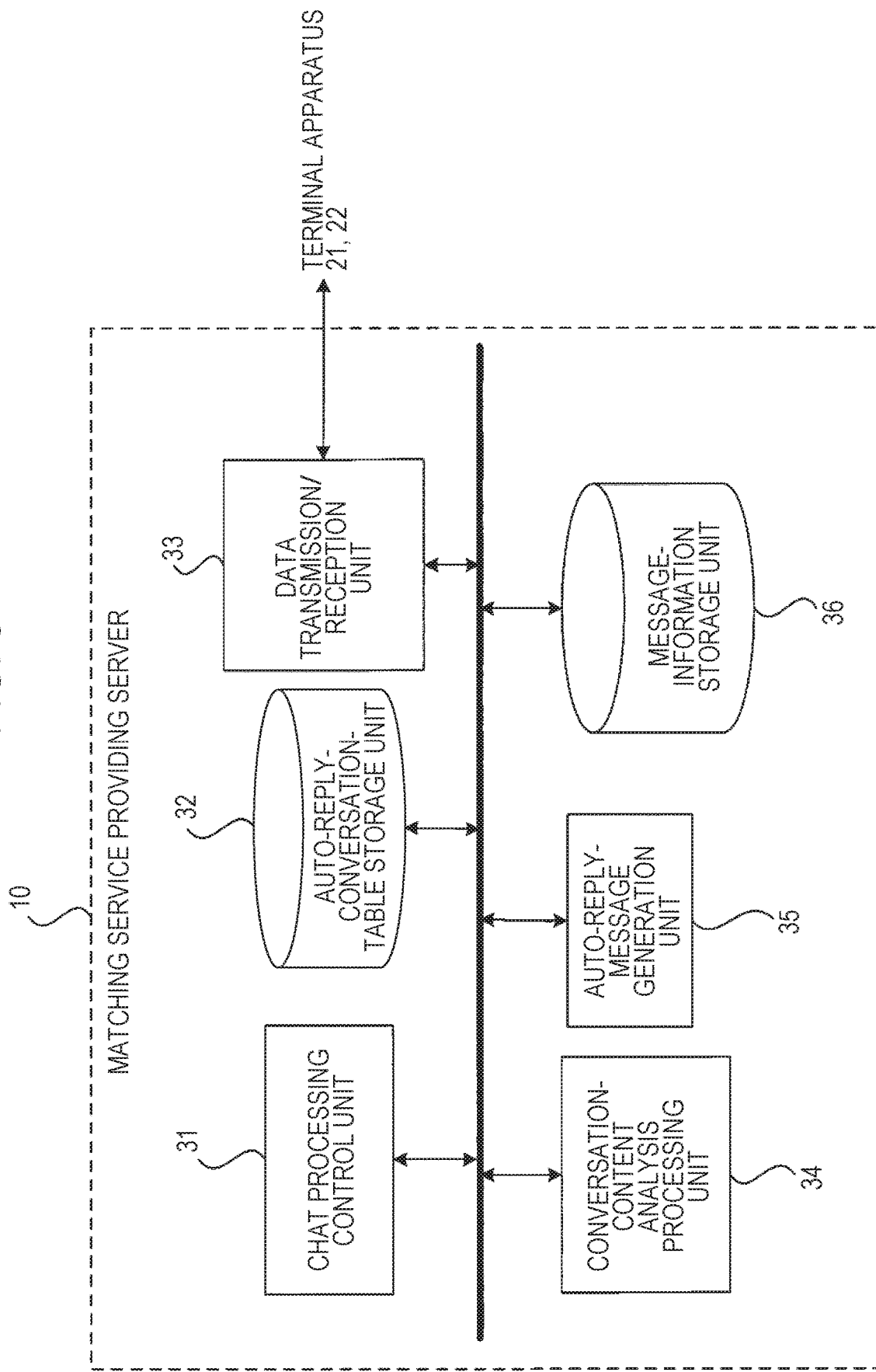
FIG. 3 is a block diagram illustrating a functional configuration of the matching-service providing server according to the exemplary embodiment of the present disclosure.

FIG. 3 is a block diagram illustrating the functional configuration of the matching-service providing server 10 that is constructed by running the above-mentioned control program.

As illustrated in FIG. 3, the matching-service providing server 10 of the present exemplary embodiment includes a chat processing control unit 31, an auto-reply-conversation-table storage unit 32, a data transmission/reception unit 33, a conversation-content analysis processing unit 34, an auto-reply-message generation unit 35, and a message-information storage unit 36. Note that FIG. 3 only illustrates the functional configuration for enabling users who are in the matched state in the matching service to have a chat.

The data transmission/reception unit 33 performs transmission and reception of data with the terminal apparatuses 21 and 22 via the Internet 30.

The chat processing control unit 31 controls processing of a chat between users and specifically performs control for transmitting conversation information from a user to another user and transmitting conversation information from the other user to the user.

The message-information storage unit 36 stores, as message information items, the past conversation information items that have been transmitted and received between users having a chat by the chat processing control unit 31.

The conversation-content analysis processing unit 34 performs analysis processing on a conversation content that is to be transmitted to a chat partner by the chat processing control unit 31.

The auto-reply-conversation-table storage unit 32 stores an auto-reply conversation table that is used to automatically reply to a message from a chat partner.

An example of the auto-reply conversation table stored in the auto-reply-conversation-table storage unit 32 is illustrated in FIG. 4.

As illustrated in FIG. 4, in the auto-reply conversation table, patterns of received messages are associated with patterns of reply messages that are used when automatically replying to such messages. For example, in the auto-reply conversation table, when a message "What is your favorite OOO?" is received, a message "I don't really have a favorite OOO." is set to be sent as a reply. Each of the reply messages has a content that makes a chat partner lose their interest as much as possible and keeps the conversation as superficial as possible, that is, a conversation content that indirectly tells the chat partner that a user has no intention to continue the conversation.

When a user chooses to use an automatic reply function for conversation information that is transmitted from another user, who is a chat partner, the auto-reply-message generation unit 35 refers to the auto-reply conversation table stored in the auto-reply-conversation-table storage unit 32 and generates an automatic reply message on the basis of analysis results obtained by the conversation-content analysis processing unit 34 so as to automatically reply to a conversation content transmitted from the chat partner.

When two users have a conversation by transmitting and receiving conversation information to and from each other, and one of the users chooses to use an automatic reply function for conversation information that is transmitted from the other user, who is the chat partner, the chat processing control unit 31 automatically replies to conversation information that is transmitted from the other user to the user by using an automatic reply message, which has been generated by the auto-reply-message generation unit 35, after the user has made the choice.

Note that the chat processing control unit 31 does not send an automatic reply in a state where users who are in the matched state have not yet started a chat. Only when one of the two users has received conversation information from the other user at least once or more, the chat processing control unit 31 automatically replies to conversation information from the chat partner on behalf of the user.

Note that such an automatic reply that is sent by a system is also called a reply by a chatbot or a bot reply.

When two users are having a chat, and one of the users chooses to use the automatic reply function for the other user, who is the chat partner, the chat processing control unit 31 performs display so as to inform the user of the fact that exchange of conversation information with the other user is being automatically performed.

In addition, when the exchange of conversation information with the other user is performed a predetermined number of times, or when the other user does not transmit conversation information for a predetermined period of time, the chat processing control unit 31 displays, to the other user, a screen that makes the user look as if the user has left the matching service.

Furthermore, when the user deactivates the automatic reply function for conversation information transmitted from the other user, the chat processing control unit 31 displays, to the user, conversation information transmitted from the other user and enables the user to resume the conversation with the other user.

The above-described operations of the chat processing control unit 31 enable the user who has desired to discontinue the chat with the other user once and has changed his/her mind to resume the chat with the other user.

When the user resumes the chat with the other user as described above and refers to the conversation history, if it is difficult for the user to distinguish between the messages replied by the user and the messages automatically replied by the system in the conversation contents, inconsistency may occur in the subsequent conversation. Thus, when the chat is resumed, the chat processing control unit 31 causes the conversation information transmitted as an automatic reply to the conversation information transmitted from the other user to be displayed in a different manner from the conversation information sent by the user himself/herself.

Note that, after the user has chosen to use the automatic reply function for conversation information transmitted from the other user, if the other user also chooses to use an automatic reply function for conversation information from the user, the chat processing control unit 31 ends the conversation between these two users.

In other words, when both the two users, who have been chatting with each other, no longer desire to continue the chat, it is useless for the system to automatically continue the conversation between these two users. Thus, in such a case, the chat processing control unit 31 does not continue but cancels the chat between the two users.

Note that, if one of two users does not reply for a predetermined period of time or longer after receiving conversation information from the other user, that is, for example, if one of two users does not reply to the other user for three or more days, the chat processing control unit 31 may automatically reply to conversation information, which is transmitted from the other, without displaying the conversation information to the user.

In other words, when a user does not reply to another user for three or more days despite the fact that these users are in the matched state, it is considered that the user does not desire to continue to chat with the other user. Therefore, even if the user does not perform an explicit operation, the chat processing control unit 31 automatically replies to a message from the other user and amicably ends the chat with the other user.

Operations in the matching-service providing server 10 of the present exemplary embodiment will be described in detail with reference to the drawings.

Note that the case will be described below in which the user A and the user B illustrated in FIG. 1 have a chat. In addition, as an example, the name of the user A is "Taro Yamada", and the name of the user B is "Hanako Suzuki".

Figure 5:
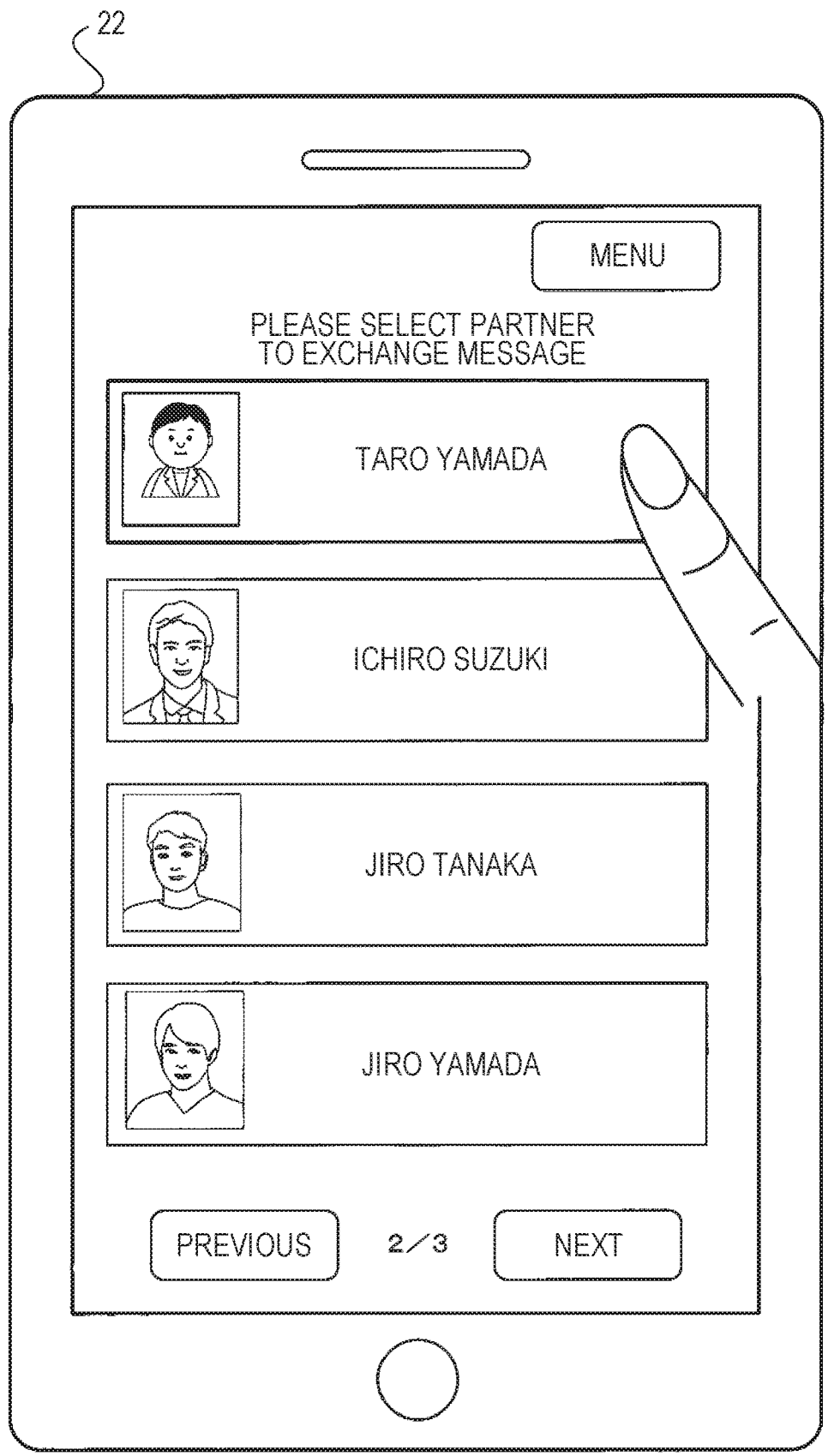
FIG. 5 is a diagram illustrating a screen example of a terminal apparatus of a user when a message-exchange-partner selection screen for selecting a chat partner among a plurality of users who are in a matched state with the user is displayed.

First, FIG. 5 illustrates a screen example of the terminal apparatus 22 of the user B when a message-exchange-partner selection screen for selecting a chat partner among a plurality of users who are in the matched state with the user B is displayed.

Referring to FIG. 5, the terminal apparatus 22 displays the names of a plurality of users including "Taro Yamada", which is the name of the user A, and facial images of these users. The case will now be described in which the user B selects "Taro Yamada", who is the user A, as a chat partner on the message-exchange-partner selection screen.

Figure 6:
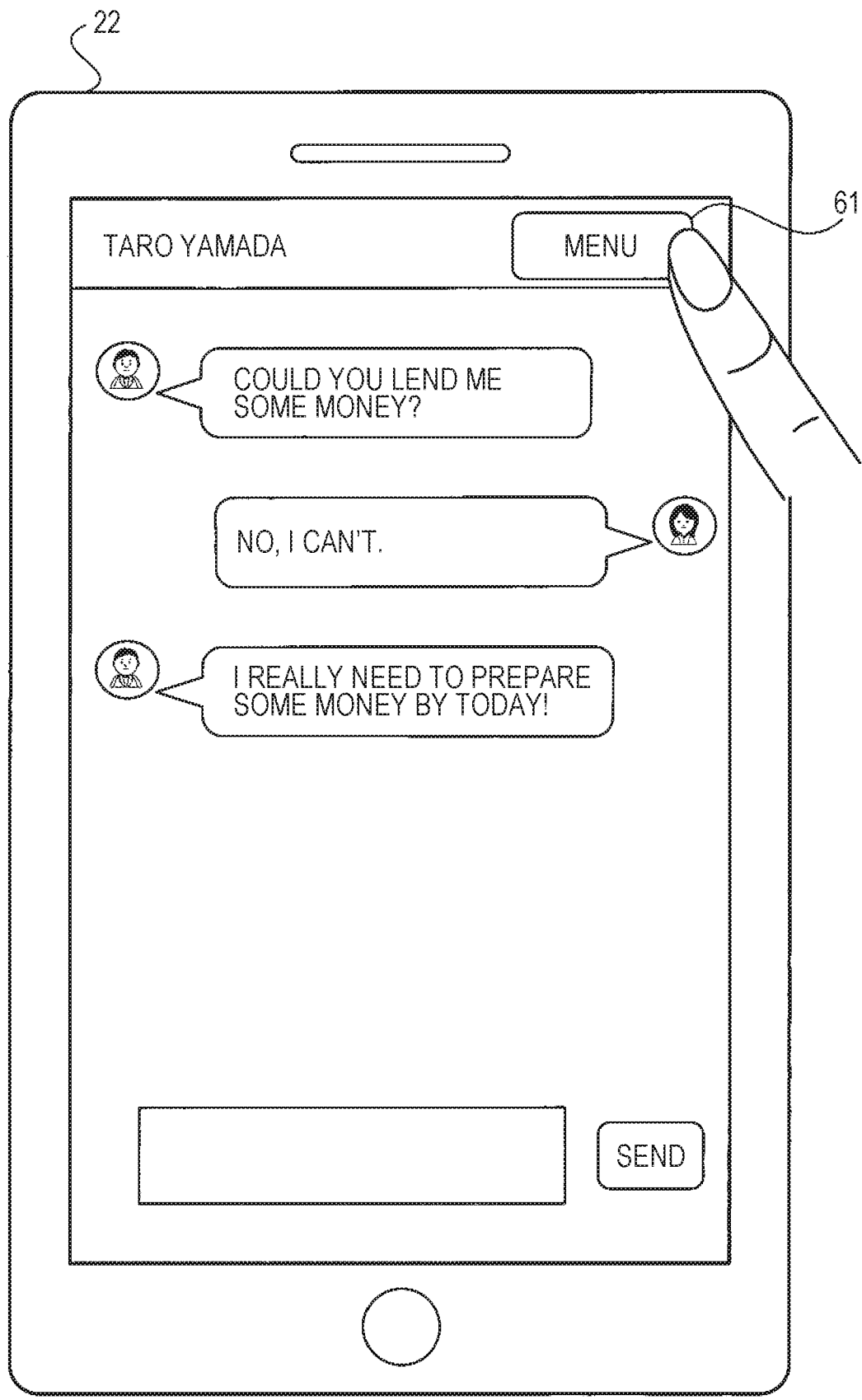
FIG. 6 is a diagram illustrating an example of a chat screen of the terminal apparatus of the user when "Taro Yamada" who is another user is selected as a chat partner.

When the user B selects "Taro Yamada", who is the user A, as a chat partner, a chat screen such as that illustrated in FIG. 6 is displayed. FIG. 6 illustrates a chat screen in a state where the user B and the user A are having a chat in which conversation information is transmitted and received between the users.

When the user B does not desire to continue the chat with the user A after the user B has received conversation information from the user A at least once or more, the user B opens a menu screen by touching a menu button 61.

Figure 7:
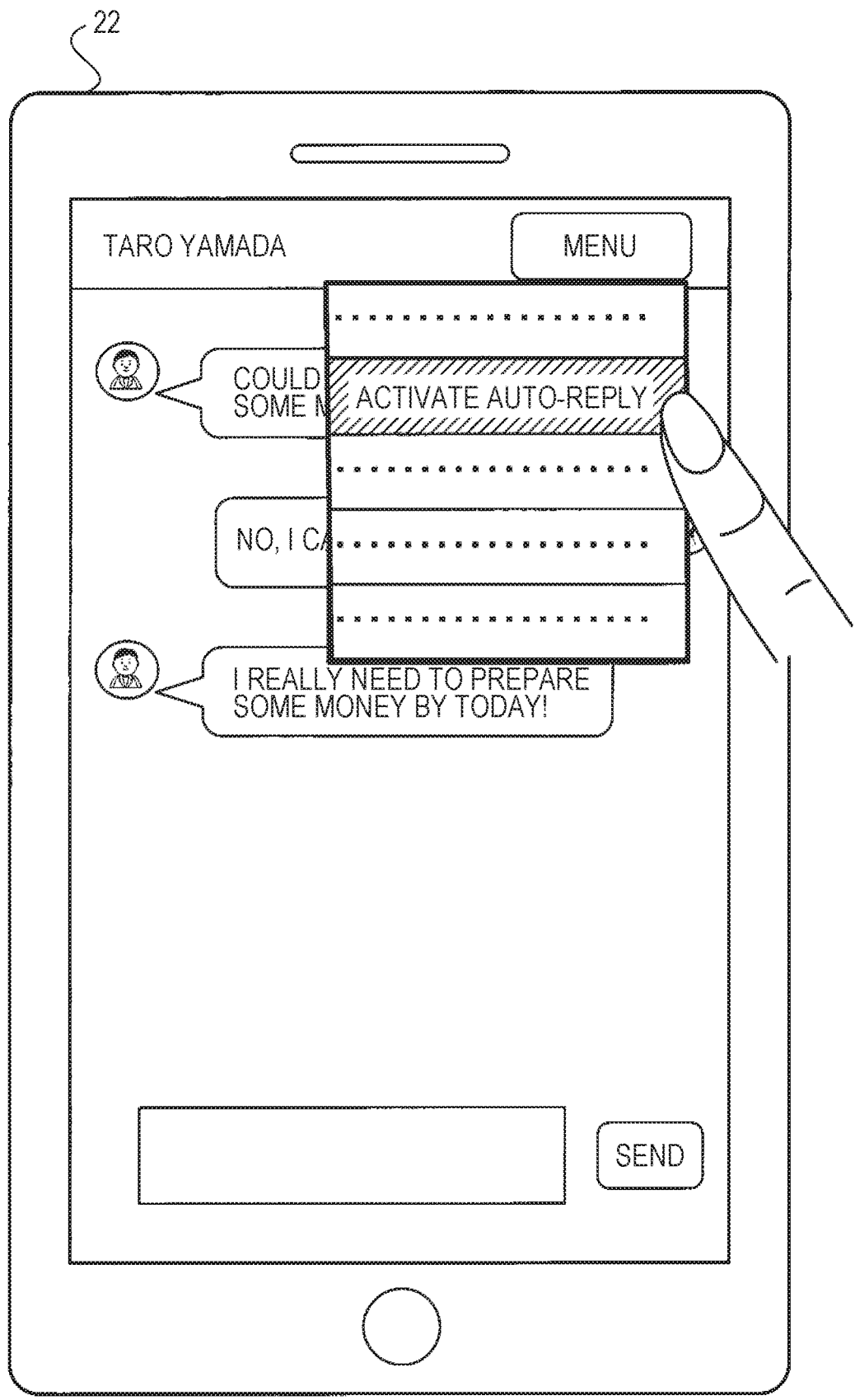
FIG. 7 is a diagram illustrating a screen example of the terminal apparatus of the user when a menu screen is open.

FIG. 7 illustrates a screen example when the menu screen is open in the manner mentioned above. In the screen example illustrated in FIG. 7, an item "activate auto-reply" is included in various menu items. When the user B chooses to use the automatic reply function for conversation information that is transmitted from the user A instead of replying to the conversation information by himself/herself, the user B selects the item "activate auto-reply".

After the user B has performed such a selection, when conversation information is transmitted from the user A, a message is automatically generated and used as an automatic reply to the conversation information without informing the user B of the reception of the conversation information.

Figure 8:
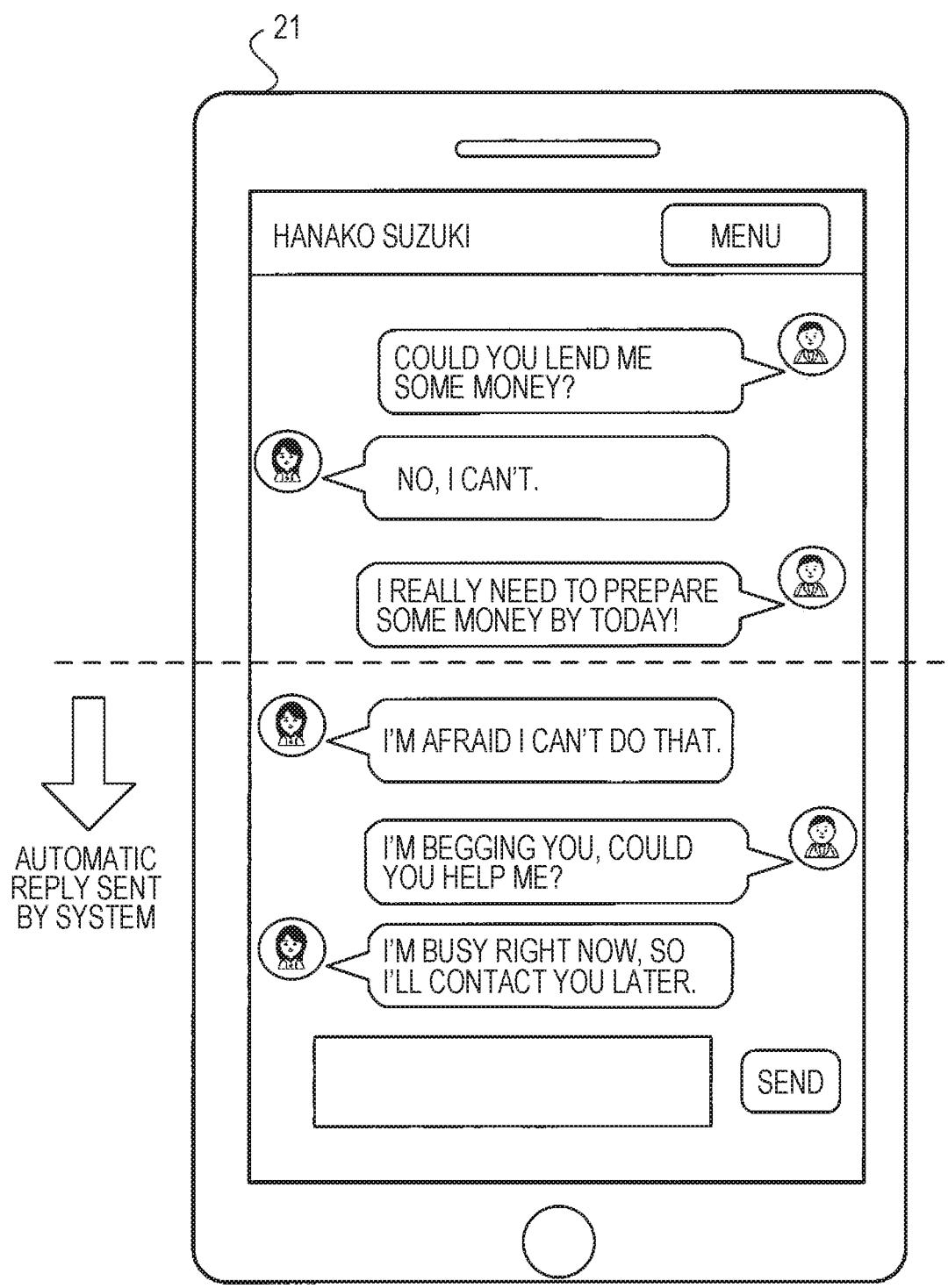
FIG. 8 is a diagram illustrating a screen example of a terminal apparatus of the other user when the user chooses to use an automatic reply function.

FIG. 8 illustrates a screen example of the terminal apparatus 21 of the user A when the user B chooses to use the automatic reply function as described above.

In the screen example illustrated in FIG. 8, the system automatically replies to messages from the user A. In FIG. 8, two conversation information items, which are "I'm afraid I can't do that." and "I'm busy right now, so I'll contact you later." are not reply messages sent by the user B but are reply messages automatically sent by the system.

These two conversation information items and other conversation information items that have been sent as replies by the user B himself/herself earlier are displayed in completely the same display manner, and thus, it is difficult for the user A to recognize that the two conversation information items are reply messages automatically sent by the system.

Figure 9:
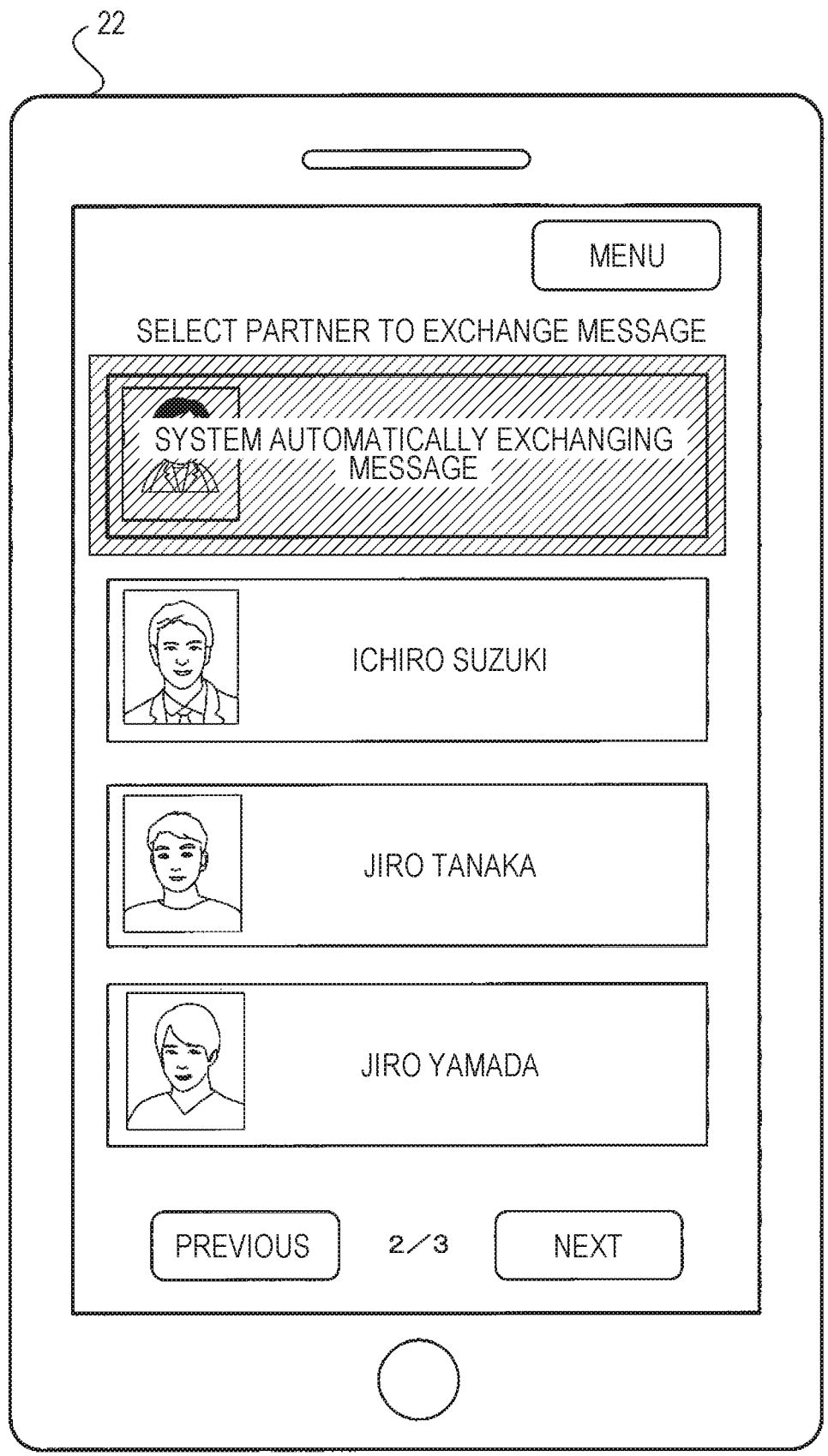
FIG. 9 is a diagram illustrating an example of the message-exchange-partner selection screen after activating the automatic reply function.

FIG. 9 illustrates an example of the message-exchange-partner selection screen after activating the automatic reply function as described above.

Referring to FIG. 9, a character string "system automatically exchanging message" is displayed on the image of the user A, to which the system is automatically replying, so as to inform the user B of the fact that exchange of conversation information with the user A is being automatically performed.

Figure 10:
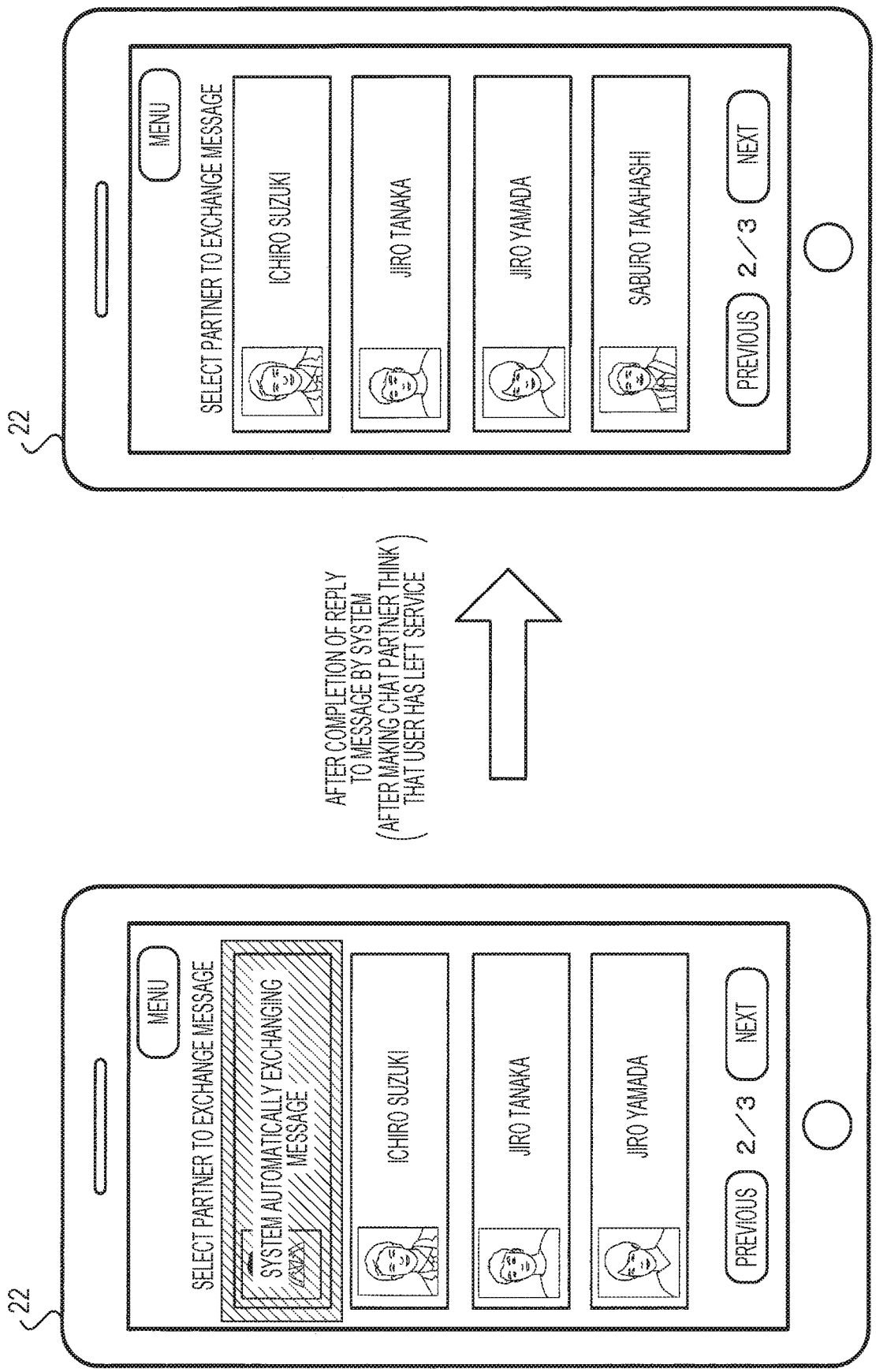
FIG. 10 is a diagram illustrating a state in which the message-exchange-partner selection screen of the terminal apparatus of the user is changed when the chat with the other user is ended.

Automatic replies are sent to the user A in the manner described above, and after the chat with the user A has been ended by making the user B look as if the user B has left the matching service, the message-exchange-partner selection screen of the user B is changed as illustrated in FIG. 10.

More specifically, it is understood from FIG. 10 that "Taro Yamada", who is the user A and to which the system had been automatically replying, is removed and is not displayed on the message-exchange-partner selection screen.

When a predetermined condition is satisfied after activating the automatic reply function, that is, for example, when messages have been exchanged three or more times after activating the automatic reply function, or when the user A, who is a message-exchange partner, has not sent a message for three or more days, the matching-service providing server 10 ends the chat by making the user A think that the user B has left the matching service.

For example, the matching-service providing server 10 sends a message "Sorry, I got busy with work, so I will delete my account." to the user A and then prevents the user A from viewing the information regarding the user B.

Figure 11:
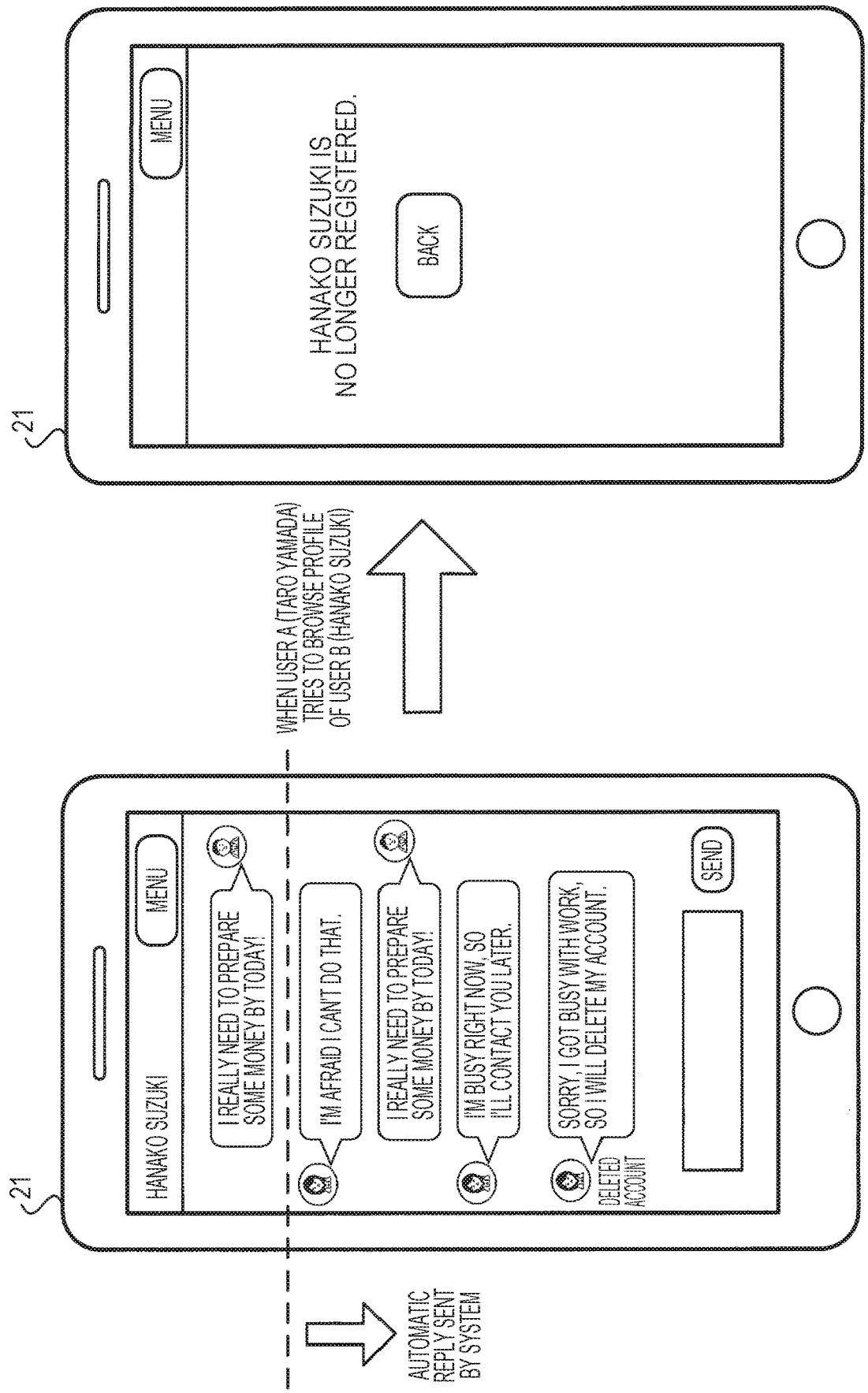
FIG. 11 is a diagram illustrating a screen example that is displayed when the other user tries to view a profile of the user.

As a result, for example, when the user A tries to browse the profile of the user B, as illustrated in FIG. 11, a character string "Hanako Suzuki is no longer registered." is displayed on the terminal apparatus 21 of the user A so as to make the user B look as if the user B has left the matching service.

Note that, even in the case where the user B has chosen to use the automatic reply function for the user A as described above, the user B is allowed to view the contents of the chat with the user A.

Figure 12:
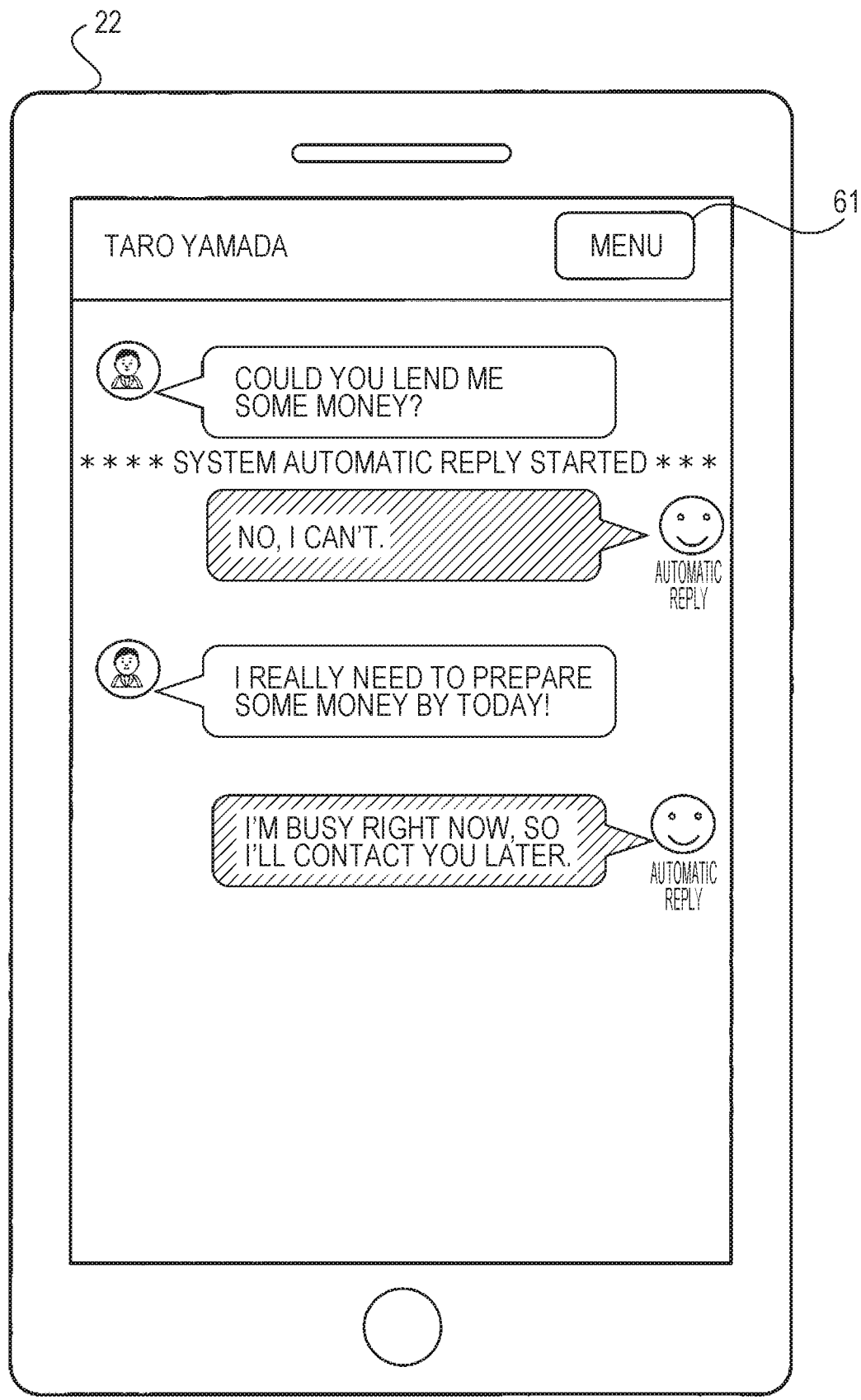
FIG. 12 is a diagram illustrating a screen example of the terminal apparatus of the user when the user views contents of conversation with the other user that is held by using the automatic reply function.

FIG. 12 illustrates a screen example of the terminal apparatus 22 of the user B when the user B views the contents of conversation with the user A that is held by using the automatic reply function.

In the screen example illustrated in FIG. 12, conversation contents transmitted as automatic replies to the chat partner by the system are displayed in a different manner from the other conversation contents transmitted by the user B. More specifically, a conversation information item transmitted as an automatic reply to the chat partner by the system is displayed in a color different from a color in which other conversation information items are displayed, and as an image that represents the sender of the conversation information, an image indicating that an automatic reply is sent by the system is used instead of the facial image of the user B.

In addition, in the display example illustrated in FIG. 12, it is recognizable which conversation information item is the first item after the automatic reply function has been activated.

Note that, although not illustrated in FIG. 12, the character size or the color used for conversation information transmitted as an automatic reply by the system may be set to be different from the character size or the color used for normal conversation information.

Alternatively, the size, the color, or the shape of each speech balloon in which conversation information is displayed may be changed.

The matching-service providing server 10 of the present exemplary embodiment also enables the user B to continue a chat with a chat partner by deactivating the automatic reply function even when the user B has activated the automatic reply function once for the chat partner.

In the case of deactivating the automatic reply function, the user B touches the menu button 61 on the screen illustrated in FIG. 12.

Figure 13:
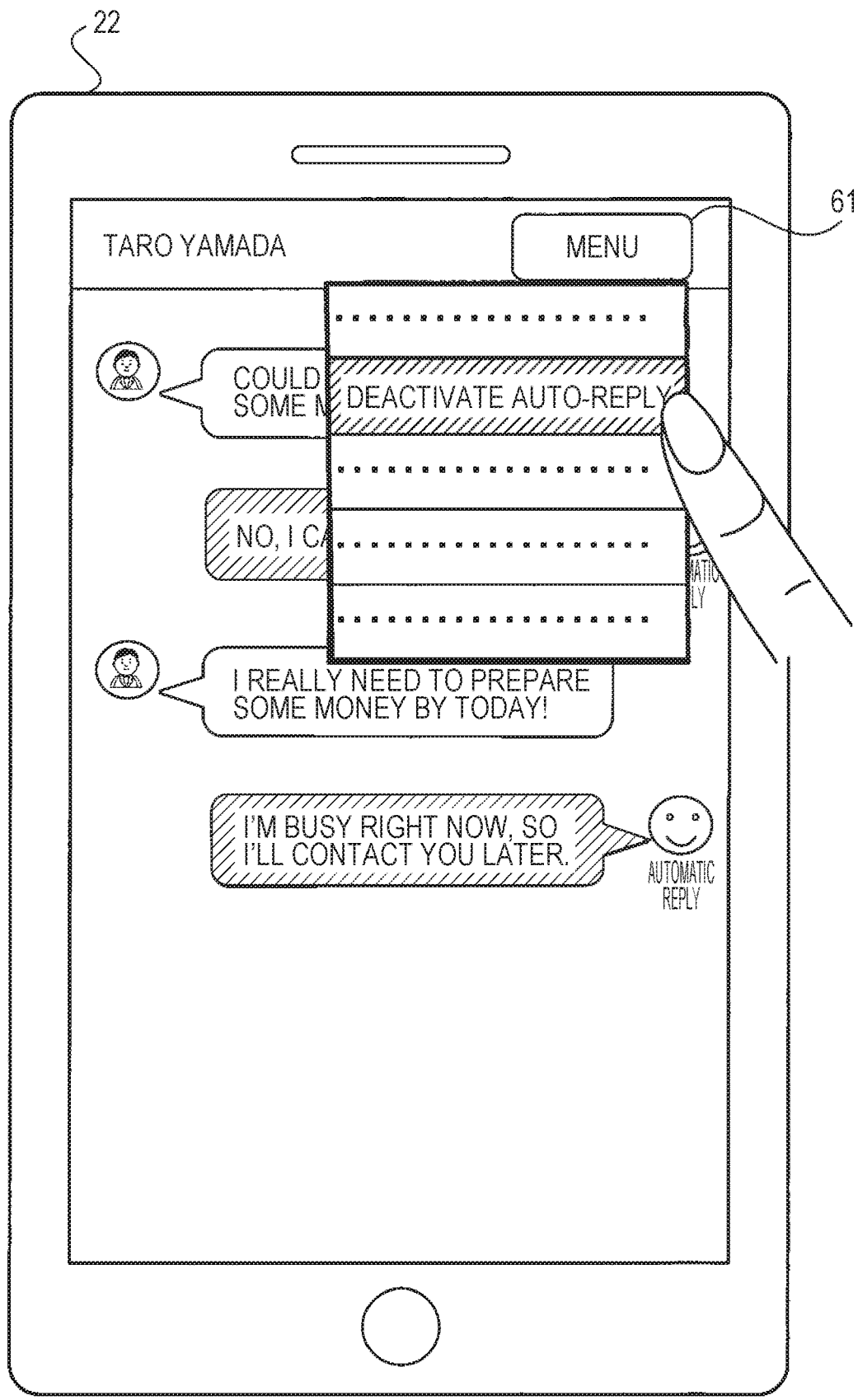
FIG. 13 is a diagram illustrating a screen example when a menu screen is displayed on a chat screen.

Then, a menu screen is displayed on the chat screen. FIG. 13 illustrates a screen example in a state where the menu screen has been opened in the manner described above. In the screen example illustrated in FIG. 13, an item "deactivate auto-reply" is included in various menu items. The user B selects the item "deactivate auto-reply" when the user B resumes the chat with the user A.

Figure 14:
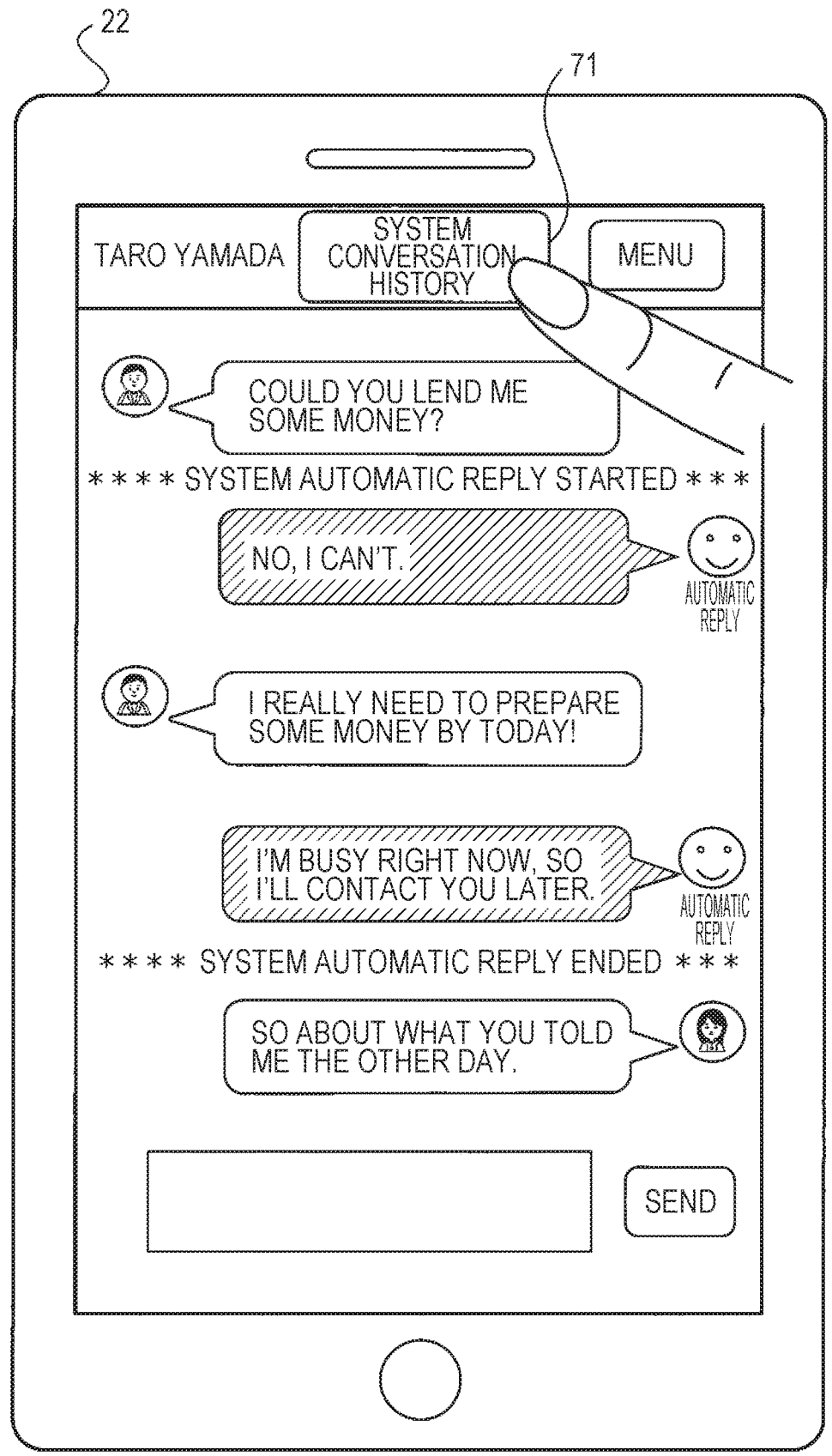
FIG. 14 is a diagram illustrating a screen example when the automatic reply function for the other user is deactivated.

After that, the automatic reply function for the user A is deactivated, and the screen is switched to a screen such as that illustrated in FIG. 14. In the screen example illustrated in FIG. 14, the automatic reply function for the user A has been deactivated, and the user B is allowed to input and transmit conversation information by himself/herself. In addition, as seen in FIG. 14, a conversation-history browse button 71 is displayed with a character string "system conversation history".

Figure 15:
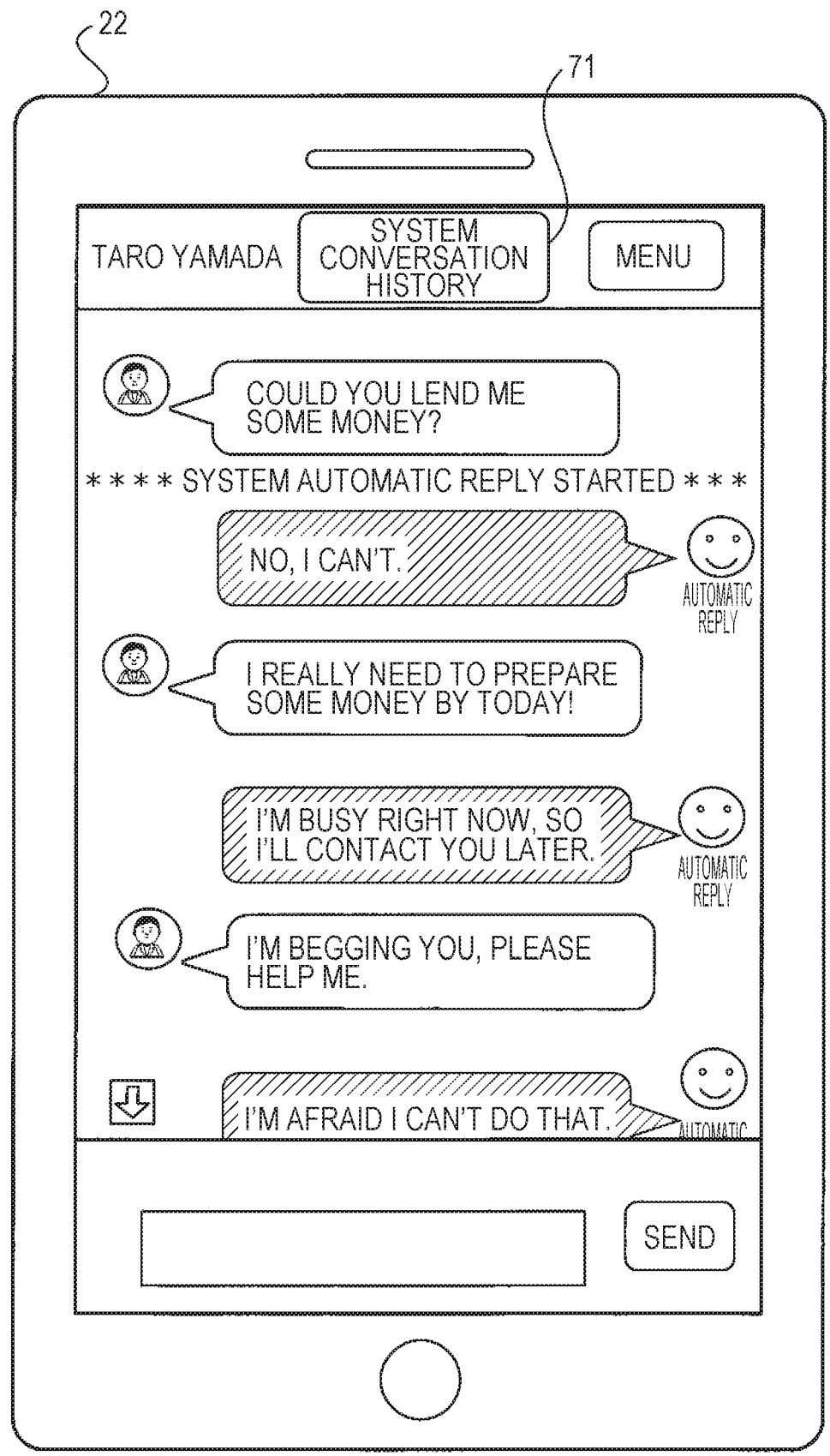
FIG. 15 is a diagram illustrating a screen example when the user touches a conversation-history browse button.

FIG. 15 illustrates a screen example when the user B touches the conversation-history browse button 71.

When the user B resumes the chat with the user A, if the user B does not check all the conversation contents that have been transmitted as automatic replies to the user A by the system, inconsistency may occur in the subsequent conversation contents.

Thus, when the user B touches the conversation-history browse button 71, the user B becomes able to check the messages that have been exchanged between the system and the user A from the beginning of the conversation that has been held after the system has started sending automatic replies. In other words, the first conversation information item transmitted after the system has started sending automatic replies is displayed, and all the subsequent conversation contents transmitted as automatic replies by the system may be sequentially viewed by scrolling the screen.

Note that the conversation-history browse button 71 is displayed on the screen when the automatic reply function is deactivated, and the system stops sending automatic replies.

When the automatic reply function for conversation information that is transmitted from a chat partner is deactivated, conversation information that has been automatically transmitted by the system may be deleted from the conversation history, or in addition to the conversation information automatically transmitted by the system, the content of the chat partner's reply to the conversation information may be deleted from the conversation history. Note that, in such a case, the conversation information transmitted by using the automatic reply function is not deleted from the chat screen of the chat partner in order to prevent the chat partner from noticing the fact that the automatic reply function had been used.

However, it is desirable to leave the conversation information transmitted by using the automatic reply function as is in order to maintain the consistency of the subsequent chat contents.

In the embodiment above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

[Modification]

In the above exemplary embodiment, although the case has been described in which a chat is held in the matching system, the present disclosure is not limited to this case and may also be applied to a chatting service that simply enables users to transmit and receive conversation information to and from each other.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a memory; and
a processor,
wherein, when first and second users have a conversation by transmitting and receiving conversation information to and from each other, and the first user chooses to use an automatic reply function for conversation information that is transmitted from the second user after the first user has received conversation information from the second user at least once or more, the processor is configured to automatically reply to conversation information that is transmitted to the first user from the second user after the first user has made the choice,
wherein the processor is configured to perform display so as to inform the first user of a fact that exchange of conversation information with the second user is automatically performed,
wherein, when exchange of conversation information with the second user is performed a predetermined number of times, or when the second user does not transmit conversation information for a predetermined period of time, the processor is configured to display, to the second user, a screen that the first user is no longer a registered user on a matching service.

2. The information processing apparatus according to claim 1,
wherein, when the first user deactivates the automatic reply function for conversation information that is transmitted from the second user, the processor displays, to the first user, conversation information transmitted from the second user and enables the first user to resume the conversation with the second user.

3. The information processing apparatus according to claim 2,
wherein, when the first user resumes the conversation with the second user, the processor is configured to cause conversation information transmitted as an automatic reply to conversation information transmitted from the second user to be displayed in a different manner from conversation information that is a reply sent by the first user himself/herself.

4. The information processing apparatus according to claim 1,
wherein, when the second user chooses to use an automatic reply function for conversation information that is transmitted from the first user after the first user has chosen to use the automatic reply function for conversation information that is transmitted from the second user, the processor is configured to end the conversation between the two users.

5. The information processing apparatus according to claim 1,
wherein, when the first user does not send a reply for a predetermined period of time after the first user has received conversation information from the second user, the processor is configured to automatically reply to the conversation information transmitted from the second user without displaying the conversation information to the first user.

6. A non-transitory computer readable medium storing a program causing a computer to execute a process, the process comprising:
receiving a choice to use an automatic reply function to conversation information that is transmitted from a second user, the choice being made by a first user, who has a conversation with the second user by transmitting and receiving conversation information to and from each other, after the first user has received conversation information from the second user at least once or more;
automatically replying to conversation information that is transmitted to the first user from the second user after the first user, who chooses to use the automatic reply function for conversation information that is transmitted from the second user, has made the choice, performing display so as to inform the first user of a fact that exchange of conversation information with the second user is automatically performed, wherein, when exchange of conversation information with the second user is performed a predetermined number of times, or when the second user does not transmit conversation information for a predetermined period of time, displaying, to the second user, a screen that the first user is no longer a registered user on a matching service.

7. An information processing apparatus comprising:

a memory; and means for, when first and second users have a conversation by transmitting and receiving conversation information to and from each other, and the first user chooses to use an automatic reply function for conversation information that is transmitted from the second user after the first user has received conversation information from the second user at least once or more, automatically replying to conversation information that is transmitted to the first user from the second user after the first user has made the choice, means for, performing display so as to inform the first user of a fact that exchange of conversation information with the second user is automatically performed, means for, when exchange of conversation information with the second user is performed a predetermined number of times, or when the second user does not transmit conversation information for a predetermined period of time, displaying, to the second user, a screen that the first user is no longer a registered user on a matching service.

* * * * *